(12) United States Patent
Egawa et al.

(10) Patent No.: US 9,728,282 B2
(45) Date of Patent: Aug. 8, 2017

(54) REMOTELY OPERATED MANIPULATOR

(71) Applicant: Hitachi, Ltd., Chiyoda-ku, Tokyo (JP)

(72) Inventors: Saku Egawa, Tokyo (JP); Satoshi Nakamura, Tokyo (JP); Makoto Hattori, Tokyo (JP); Junichi Tamamoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1 day.

(21) Appl. No.: 14/766,037

(22) PCT Filed: Feb. 12, 2013

(86) PCT No.: PCT/JP2013/053176
§ 371 (c)(1),
(2) Date: Aug. 5, 2015

(87) PCT Pub. No.: WO2014/125556
PCT Pub. Date: Aug. 21, 2014

(65) Prior Publication Data
US 2015/0367507 A1   Dec. 24, 2015

(51) Int. Cl.
*G21C 17/003* (2006.01)
*G21C 19/34* (2006.01)
(Continued)

(52) U.S. Cl.
CPC ............. *G21C 17/003* (2013.01); *B25J 5/02* (2013.01); *B25J 9/023* (2013.01); *B25J 9/041* (2013.01);
(Continued)

(58) Field of Classification Search
CPC ..... B25J 9/023; B25J 9/041; B25J 5/02; B25J 11/005; G21C 19/34; G21C 19/10;
(Continued)

(56) References Cited

U.S. PATENT DOCUMENTS

| 2,679,940 A | * | 6/1954 | Goertz | ........................ B25J 5/02 |
| | | | | 414/728 |
| 3,033,059 A | * | 5/1962 | James | ........................ B25J 5/02 |
| | | | | 414/627 |

(Continued)

FOREIGN PATENT DOCUMENTS

| AT | 325168 B | * | 10/1975 | ............. G21C 13/00 |
| DE | 2930389 A1 | * | 2/1980 | ............. B25J 9/041 |

(Continued)

OTHER PUBLICATIONS

International Search Report (PCT/ISA/210) dated May 14, 2013 with English-language translation (four (4) pages).

*Primary Examiner* — Eret McNichols
(74) *Attorney, Agent, or Firm* — Crowell & Moring LLP

(57) ABSTRACT

Provided is a remotely operated manipulator which can be applied to a space which is wider on a back side than at an opening part, which has a simple structure, high stiffness, and high reliability. The remotely operated manipulator of the present invention includes: a circular base fixed to a wall surface; a beam which rotates on the circular base; a trolley which moves on the beam; and a mast which is raised and lowered with respect to the trolley and is mounted with a tool unit at a tip. Stiffness is improved by directly fixing the beam to the wall surface by a beam fixing device. Further, a work region is expanded by mounting a bending mast on the tip of the mast.

6 Claims, 3 Drawing Sheets

(51) Int. Cl.

| | |
|---|---|
| *B25J 5/02* | (2006.01) |
| *G21C 17/013* | (2006.01) |
| *G21C 17/01* | (2006.01) |
| *G21C 19/10* | (2006.01) |
| *G21C 19/02* | (2006.01) |
| *G21F 9/30* | (2006.01) |
| *B25J 9/02* | (2006.01) |
| *B25J 9/04* | (2006.01) |
| *G21D 1/00* | (2006.01) |
| *B25J 11/00* | (2006.01) |
| *B25J 15/00* | (2006.01) |
| *F16M 13/02* | (2006.01) |

(52) U.S. Cl.
CPC ......... *B25J 11/005* (2013.01); *B25J 15/0019* (2013.01); *F16M 13/022* (2013.01); *G21C 17/01* (2013.01); *G21C 17/013* (2013.01); *G21C 19/02* (2013.01); *G21C 19/10* (2013.01); *G21C 19/34* (2013.01); *G21D 1/003* (2013.01); *G21F 9/30* (2013.01); *Y02E 30/40* (2013.01); *Y10S 901/16* (2013.01); *Y10S 901/17* (2013.01); *Y10S 901/27* (2013.01); *Y10S 901/41* (2013.01)

(58) Field of Classification Search
CPC .... G21C 17/01; G21C 17/003; G21C 17/013; G21C 19/02; G21D 1/003
See application file for complete search history.

(56) References Cited

U.S. PATENT DOCUMENTS

| | | | | |
|---|---|---|---|---|
| 3,780,571 A | * | 12/1973 | Wiesener | B25J 5/00 348/83 |
| 4,169,758 A | * | 10/1979 | Blackstone | G21C 17/01 348/83 |
| 4,174,999 A | * | 11/1979 | Burns | G21C 17/01 376/249 |
| 4,311,556 A | * | 1/1982 | Iwamoto | G21C 17/01 376/249 |
| 4,368,644 A | * | 1/1983 | Wentzell | G01N 29/265 376/249 |
| 4,666,050 A | | 5/1987 | Krieger et al. | |
| 5,369,676 A | | 11/1994 | Ortega et al. | |
| 5,873,214 A | * | 2/1999 | Moore | B65B 11/025 414/744.6 |
| 6,104,772 A | * | 8/2000 | Dippel | F16L 55/26 104/138.2 |
| 6,240,155 B1 | * | 5/2001 | Kurosawa | G21C 19/00 376/249 |
| 7,773,717 B2 | * | 8/2010 | Ketcham | G21C 3/335 376/245 |
| 8,359,944 B2 | * | 1/2013 | Li | B25J 5/02 74/490.03 |
| 9,064,608 B2 | * | 6/2015 | Olsen | G21C 17/01 |
| 2008/0205577 A1 | | 8/2008 | Ketcham et al. | |
| 2013/0245823 A1 | * | 9/2013 | Kimura | B25J 5/02 700/248 |
| 2015/0332796 A1 | * | 11/2015 | Park | G21C 17/01 376/260 |
| 2015/0375390 A1 | * | 12/2015 | Becroft | B25J 9/0018 427/427.2 |
| 2016/0031088 A1 | * | 2/2016 | Suzuki | B23Q 11/0891 414/222.08 |
| 2016/0107312 A1 | * | 4/2016 | Morrill | B25J 9/1664 29/402.08 |
| 2017/0018321 A1 | * | 1/2017 | Ketcham | G21C 17/007 |

FOREIGN PATENT DOCUMENTS

| | | | | |
|---|---|---|---|---|
| DE | WO 0054283 A1 | * | 9/2000 | ............ F22B 37/003 |
| DE | 19718386 B4 | | 9/2004 | ................. B25J 9/00 |
| EP | 0017744 A1 | * | 10/1980 | ......... G01N 29/0645 |
| FR | 0052570 A1 | * | 5/1982 | ............. G21C 17/01 |
| FR | 0638198 B1 | * | 6/1998 | ........... G21C 17/003 |
| GB | 1573593 A | * | 8/1980 | ............. G21C 17/01 |
| IT | WO 2009069154 A1 | * | 6/2009 | ................. B25J 5/04 |
| JP | 58-80597 A | | 5/1983 | |
| JP | 62-125165 A | | 6/1987 | |
| JP | 63-190272 U | | 12/1988 | |
| JP | 7-151897 A | | 6/1995 | |
| JP | 8-75892 A | | 3/1996 | |
| JP | 2008-216246 A | | 9/2008 | |
| JP | 2011017670 A | * | 1/2011 | ............. G21C 17/01 |

\* cited by examiner

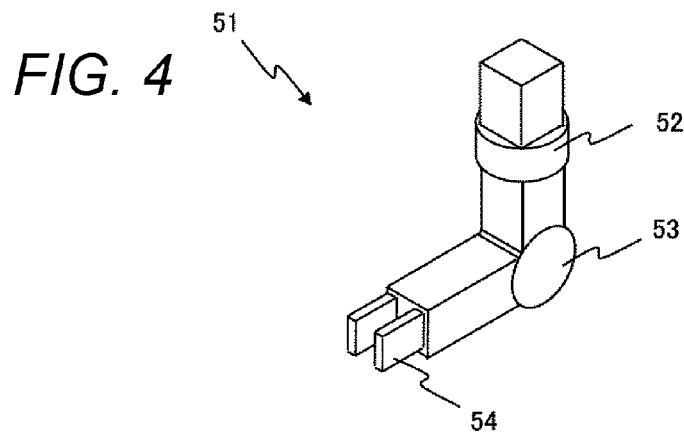
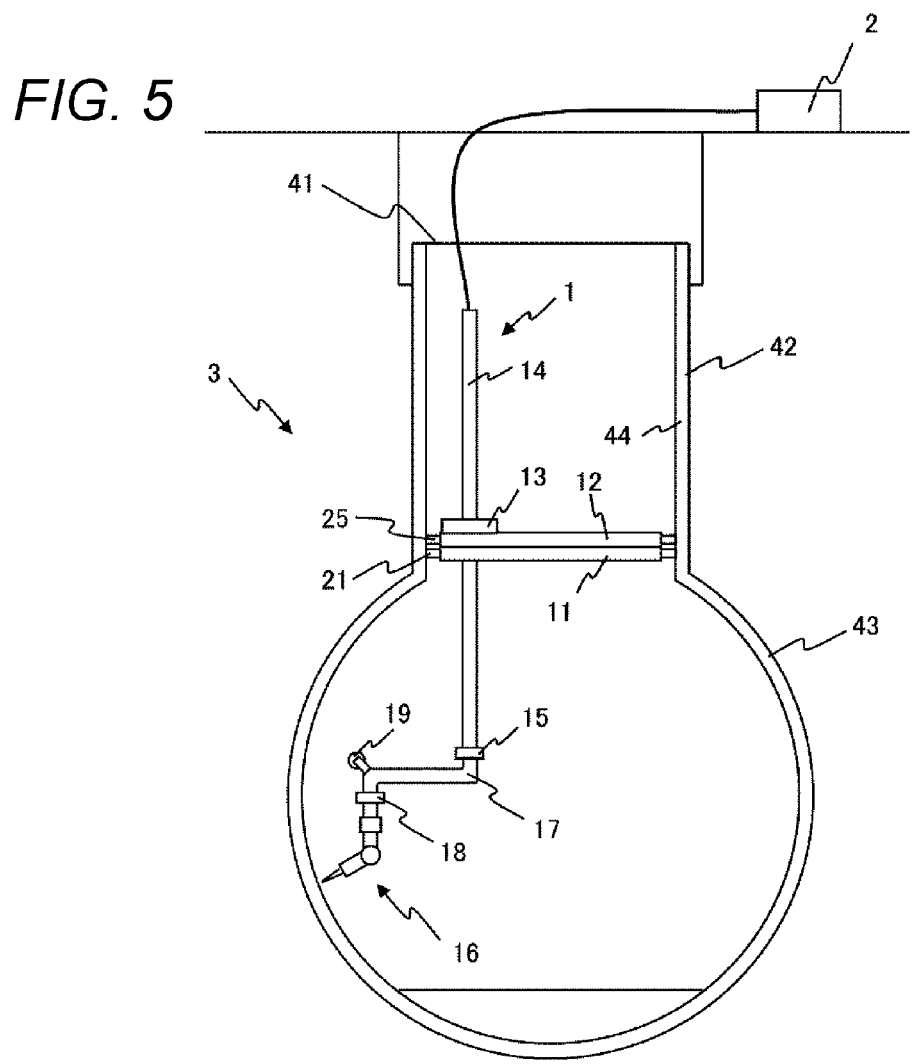

REMOTELY OPERATED MANIPULATOR

TECHNICAL FIELD

The present invention relates to a remotely operated manipulator, and more particularly to a remotely operated manipulator suitable for a work in a space having a shape which is wider on a back side than at an opening part.

BACKGROUND ART

A remotely operated manipulator is used for a work in a place where a person cannot approach, such as a dismantling work of a nuclear reactor. Patent Document 1 discloses a reactor dismantling device for dismantling a structure within a reactor pressure vessel by a remote operation. In this reactor dismantling device, a revolving frame is provided on an auxiliary mount for a work installed in a nuclear reactor, and a telescopic mast having a manipulator is provided at the revolving frame. Further, the telescopic mast is provided with a stabilizer which has a leg stretching to an inner wall surface of the reactor and which prevents a swing of the mast and a reaction force during the work.

CITATION LIST

Patent Document

Patent Document 1: Japanese unexamined patent publication No. Hei 8-75892 A

SUMMARY OF THE INVENTION

Technical Problem to be Solved by the Invention

There is a problem in that the reactor dismantling device disclosed in Patent Document 1 is not easily applied to a work within a reactor containment vessel having a shape which is wider at a lower part.

When the work is performed within the reactor containment vessel having the shape which is wider at the lower part, it is necessary to perform the work by lowering the manipulator from an opening part into the containment vessel. Since the reaction force is applied to a tip part of the manipulator during performance of the work, it is necessary to securely hold the tip part with high stiffness. However, in the shape which is wider at the lower part, since a back side is wider than the opening part and is sloped, it is difficult to increase stability by stretching the leg from a vicinity of the tip to the wall surface.

Further, when the work is performed at a deep place, it is easiest to lower the tip part straight from above. However, in this manner, the manipulator cannot access a space expanding to an outer side of a space directly below the opening part. By using a complicated mechanism, it is possible to move the tip laterally and access the outer side. However, there is a problem in that stiffness of the mechanism lowers. Further, reliability lowers, and particularly in a case where a failure occurs during the work in the outer space, there is concern that the entire manipulator cannot be raised.

Therefore, an object of the present invention is to provide a remotely operated manipulator which can be applied to a space which is wider on aback side than at an opening part, which has a simple structure, high stiffness, and high reliability.

Solution to Problem

To achieve the aforementioned object, a remotely operated manipulator according to the present invention includes: a circular base which includes a fixing device to a wall surface; a beam rotatably installed to the circular base; a trolley movably installed to the beam; and a mast which is installed so as to be capable of being raised and lowered with respect to the trolley and is mounted with a tool unit at a tip, wherein the beam is directly fixed to the wall surface by a beam fixing device provided at the beam.

Advantageous Effects of the Invention

In the remotely operated manipulator of the present invention, since the beam can be directly fixed to the wall surface, high stiffness is secured during the work.

BRIEF DESCRIPTION OF THE DRAWINGS

FIG. 4 is a diagram illustrating a grasping unit.
FIG. 5 is a perspective view illustrating a work in an outer peripheral space of the remotely operated manipulator of the present invention.

DESCRIPTION OF THE EMBODIMENTS

An embodiment of the present invention is hereinafter described with reference to the drawings.

Embodiment 1

Figure 1:
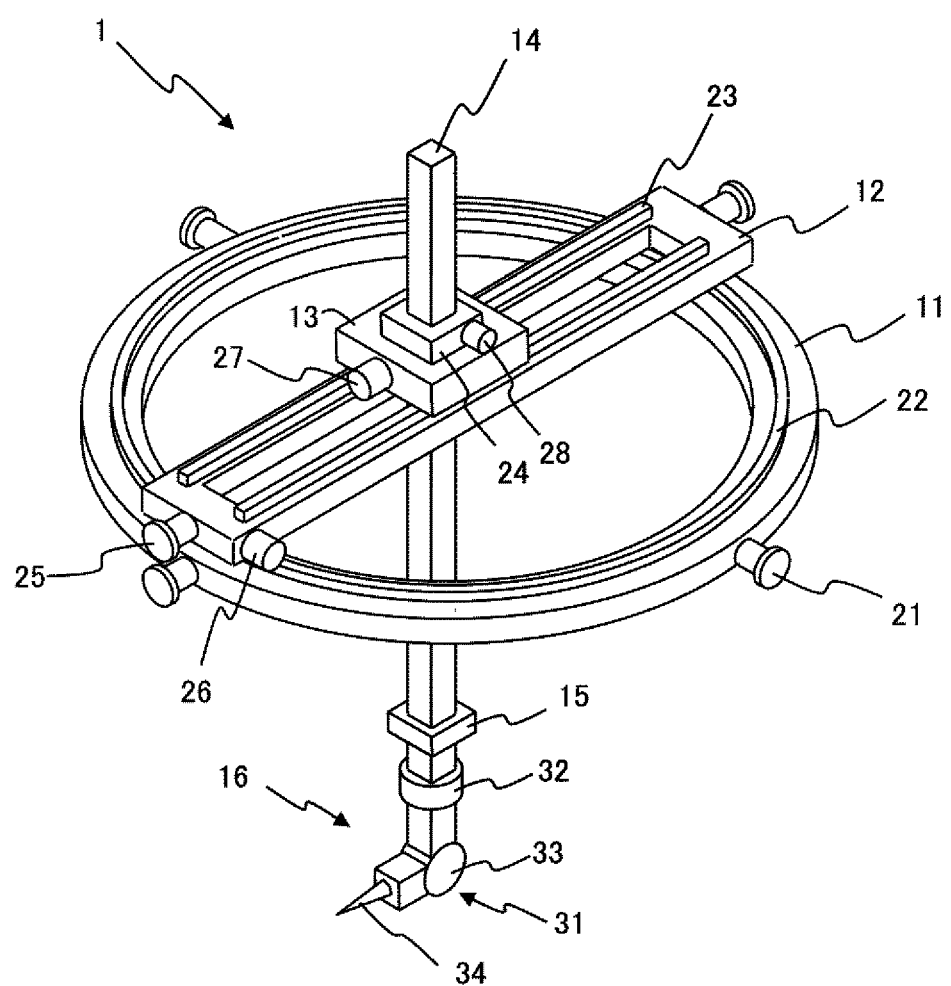
FIG. 1 is a perspective view illustrating a remotely operated manipulator of the present invention.
Figure 2:
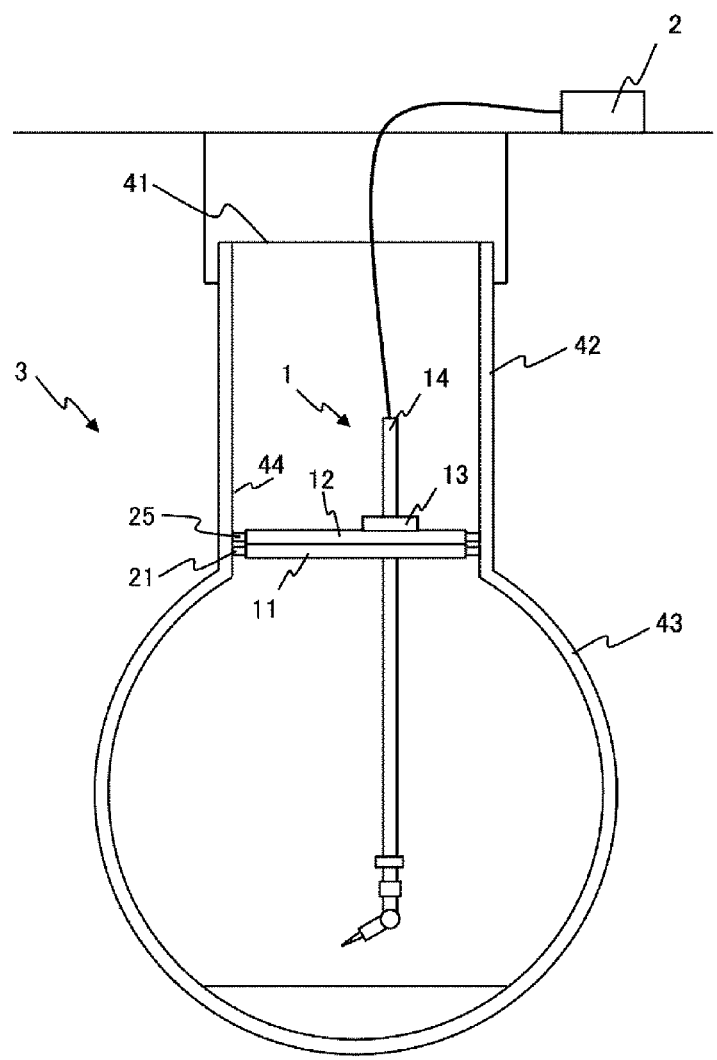
FIG. 2 is a side view illustrating a use state of the remotely operated manipulator of the present invention.

FIG. 1 illustrates one embodiment of a remotely operated manipulator of the present invention. FIG. 2 illustrates an example of a use state of the remotely operated manipulator in the present invention. In FIG. 2, a work within a reactor containment vessel 3 having a shape which is wider at an opening part 41 than a containment vessel lower part 43 is assumed. As illustrated in FIG. 2, a lid of the containment vessel 3 is opened to perform the work inside, and the opening part 41 is provided at an upper end. The containment vessel 3 has a flask shape which is wider at the lower part. A cylindrical part 42 is provided directly below the opening part 41. The spherical containment vessel lower part 43, which is wider than the opening part 41 and the cylindrical part 42, is provided below and on a backside of the cylindrical part 42. A configuration of the remotely operated work manipulator of the present invention is hereinafter described with reference to FIGS. 1 and 2.

The remotely operated manipulator 1 includes a circular base 11, a beam 12, a trolley 13, and a mast 14. The circular base 11 includes a plurality of base fixing devices 21 along a circumference. The base fixing device 21 can fix the circular base 11 by stretching against a wall surface 44 of the cylindrical part 42 of the reactor containment vessel 3. The beam 12 can be rotated and stopped by a beam driving device 26 on a circular rail 22 provided at the circular base. Further, the beam 12 includes a beam fixing device 25 on each end. The beam fixing device 25 can fix the beam 12 by stretching against the wall surface 44 of the cylindrical part 42. The trolley 13 can be moved and stopped by a trolley driving device 27 on a linear rail 23 provided on the beam 12. The mast 14 can be raised/lowered and stopped by a mast driving device 28 along a raising/lowering guide 24 provided at the trolley 13.

A device which fixes by pressing a pad in a wall direction by a jack driven by, for example, electromotion, hydraulic pressure, water pressure, and the like can be used for the base fixing device 21 and the beam fixing device 25.

Besides an electric motor, a water pressure-type or hydraulic pressure-type motor, cylinder, and the like can be used for the beam driving device 26, the trolley driving device 27, and the mast driving device 28.

A tool exchange device 15 is provided at a tip of the mast 14, and a tool unit 16 can be exchanged by attaching to/removing from the mast 14. Various types of tool units 16 can be used.

FIG. 1 illustrates an example of a tool for cutting an object as the tool unit 16. A cutting unit 31 includes a rotating shaft 32 and a pitch shaft 33 and can turn a cutting tool 34 at a tip in an arbitrary direction. For example, an abrasive water jet cutter which performs a cutting work by discharging abrasive-containing water jet can be used for the cutting tool 34.

Figure 3:
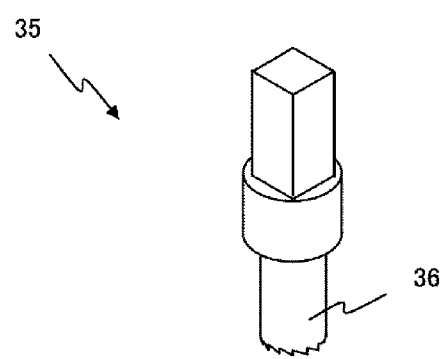
FIG. 3 is a diagram illustrating a drill unit.

FIG. 3 is an example of a tool for drilling. A drill unit 35 includes drill teeth 36. By lowering the mast 14, downward drilling and material collection can be performed.

FIG. 4 is an example of a tool for grasping and carrying an object. A grasping unit 51 includes a rotating shaft 52 and a pitch shaft 53 and can turn a hand 54 at a tip in an arbitrary direction. By opening and closing the hand 54, the object can be grasped or released.

Besides an electric motor, a water pressure-type or hydraulic pressure-type motor, cylinder, or the like can be used for driving a movable part of the above-described tool.

An instruction from an operator is input by an operation input device 2. The remote work is performed by moving the beam fixing device 25, the beam driving device 26, the trolley driving device 27, the mast driving device 28, and the tool unit 16 accordingly.

When the manipulator 1 is installed in the reactor containment vessel 3, the circular base 11 is suspended by a crane, is lowered into the cylindrical part 42 from the opening part 41, and is fixed by the base fixing device 21 by stretching to the wall surface 44. A height which fixes the circular base 11 is determined according to a height of a place for performing the work. In a case where the work is performed near a bottom of the containment vessel lower part 43, the circular base 11 is fixed to a lower end of the cylindrical part 42.

A method of the work by the remotely operated manipulator of the present invention is described below.

The operator operates the operation input device 2. First, the beam fixing device 25 is shortened, and fixation of the beam 12 is released. Next, the beam driving device 26, the trolley driving device 27, and the mast driving device 28 are driven to move the beam 12, the trolley 13, and the mast 14. The tool unit 16 is guided to the place for performing the work. Since movement of three degree of freedom of a cylindrical coordinate system can be realized by the beam 12, the trolley 13, and the mast 14, the tool unit 16 can be moved to an arbitrary place.

After the tool unit 16 is positioned at a target place, the beam driving device 26, the trolley driving device 27, and the mast driving device 28 are fixed by applying a brake thereto. Further, the beam 12 is fixed by stretching the beam fixing device 25 against the wall surface 44. With this configuration, the beam 12 is directly fixed to the wall surface 44 without using the circular base 11. Accordingly, the beam 12 can be fixed with high stiffness, fluctuations when processing reaction force is applied to the tool unit 16 can be suppressed, and accuracy and efficiency of the work improve.

FIG. 5 illustrates a device configuration of a case where the work is performed in a space near an outer periphery of an inside of the containment vessel lower part 43. In this case, a bending mast 17 is mounted on the tool exchange device 15. The bending mast 17 is bent in an outer peripheral direction, and is provided with a roller 19 at a corner part and a tool exchange device 18 at a tip. By mounting the tool unit 16 on the tool exchange device 18 of the bending mast 17, the work near the outer periphery can be performed. With this configuration, an access to a space which is wider on a back side is made possible and a work region can be expanded while maintaining the high stiffness. Since the bending mast 17 has a simple structure without a movable part, a work space can be expanded without impairing reliability and stiffness.

When the work is performed using the bending mast 17 in the space near the outer periphery of the containment vessel lower part 43, in a case where a drive device fails and does not move, the entire manipulator 1 can be lifted up and repaired as follows.

First, a brake of the trolley beam driving device 27 is released, and the trolley is moved freely. After that, stretching of the base fixing device 21 and the beam fixing device 25 is released, and the circular base 11 is lifted up by the crane. At this time, the bending mast 17 is brought into contact with the wall surface of the containment vessel lower part 43. However, since the roller 19 exists at the contact part, the bending mast 17 is pressed inward and the trolley is moved inward. With this configuration, the entire manipulator 1 can be lifted up without the bending mast 17 from being caught by the containment vessel lower part 43.

The above description illustrates an example in which the remotely operated manipulator 1 of the present invention is used in the work inside the reactor containment vessel. However, the remotely operated manipulator 1 can be applied to various works, such as a case of constructing a tunnel or a mine from a vertical shaft, in a space which is wider on a back side than at an entrance. Further, even in a case where a space which is not wide on a back side, an effect of improving stiffness can be obtained by fixing the beam to the wall surface.

REFERENCE SIGNS LIST 1 remotely operated manipulator
2 operation input device
3 reactor containment vessel
11 circular base
12 beam
13 trolley
14 mast
15 tool exchange device
16 tool unit
17 bending mast
18 tool exchange device
19 roller
21 base fixing device
22 circular rail
23 linear rail
24 raising/lowering guide
25 beam fixing device
26 beam driving device
27 trolley driving device
28 mast driving device
31 cutting unit
32 rotating shaft
33 pitch shaft 34 cutting tool
35 drill unit
36 drill teeth
41 opening part
42 cylindrical part
43 containment vessel lower part
44 wall surface
51 grasping unit
52 rotating shaft
53 pitch shaft
54 hand

The invention claimed is:

1. A remotely operated manipulator, comprising:
a circular base which includes a fixing device to fix the circular base to a wall surface;
a beam rotatably installed to the circular base;
a trolley movably installed to the beam;
a mast which is installed so as to be capable of being raised and lowered with respect to the trolley and is mounted with a tool exchange device at a tip;
a tool unit mounted on the tool exchange device; and
a beam fixing device which is provided at the beam, extends to fix the beam to the wall surface, and shortens to release the beam from the wall surface.

2. The remotely operated manipulator according to claim 1, wherein the beam fixing device is one of a pair of beam fixing devices provided at both ends of the beam to fix the beam by pressing against the wall surface.

3. The remotely operated manipulator according to claim 2, wherein the tool exchange device includes first tool exchange device and second tool exchange device attached to the tool unit, and a bending mast is provided between the first tool exchange device and the second tool exchange device, and one end of the bending mast is mounted on the first tool exchange device and the other end of the bending mast is mounted on the second tool exchange device.

4. The remotely operated manipulator according to claim 3, wherein a flexed part of the bending mast is provided with a roller.

5. The remotely operated manipulator according to claim 1, wherein the tool exchange device includes first tool exchange device and second tool exchange device attached to the tool unit, and a bending mast is provided between the first tool exchange device and the second tool exchange device, and one end of the bending mast is mounted on the first tool exchange device and the other end of the bending mast is mounted on the second tool exchange device.

6. The remotely operated manipulator according to claim 5, wherein a flexed part of the bending mast is provided with a roller.

* * * * *